Oct. 11, 1955
C. B. FETT
2,720,234
SLAW CUTTER
Filed April 2, 1953
2 Sheets-Sheet 1
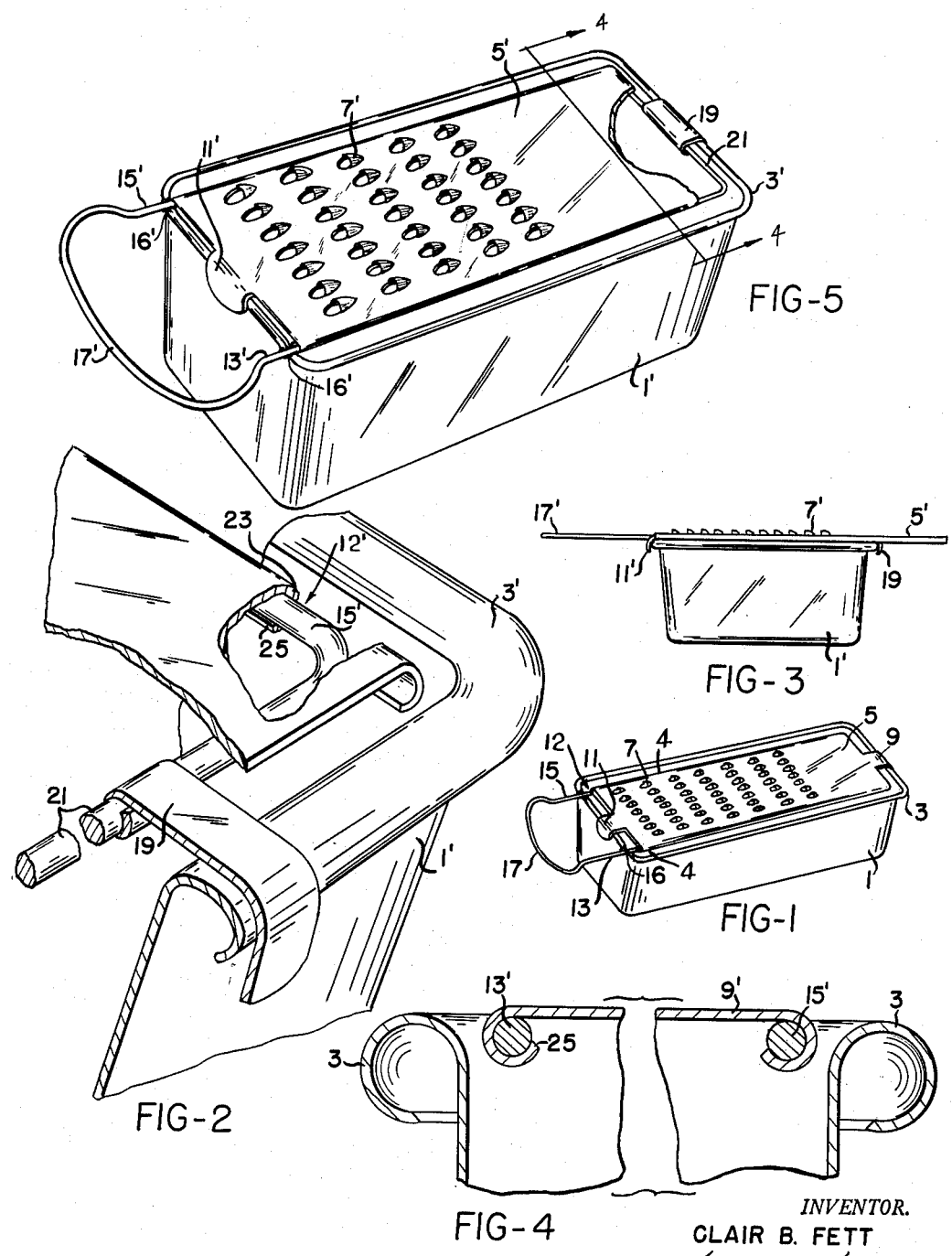
INVENTOR.
CLAIR B. FETT
ATTORNEYS Oct. 11, 1955 C. B. FETT 2,720,234
SLAW CUTTER Filed April 2, 1953 2 Sheets-Sheet 2

INVENTOR.
CLAIR B. FETT
BY
ATTORNEYS

United States Patent Office 2,720,234
Patented Oct. 11, 1955

2,720,234

SLAW CUTTER

Clair B. Fett, Bluffton, Ohio, assignor to Bluffton Slaw Cutter Co., Bluffton, Ohio, a copartnership Application April 2, 1953, Serial No. 346,410

6 Claims. (Cl. 146—180)

This invention relates to a new and improved cutter for slaw, vegetables and the like.

The primary object of the present invention is to provide a novel slaw cutter capable of being used on dishes, pans, and so forth, of standard lengths.

A particular object of this invention is to provide a slaw cutter in which the portions thereof engageable with a standard pan or receiver are resilient.

It is an important object of this invention to provide a novel slaw cutter which may be securely held on a receiver of standard length and which cutter is adjustable for accommodation to various lengths.

Another object of this invention is to provide a novel slaw cutter in which adjustability is provided through handle means of the slaw cutter.

These and other allied objectives of this invention will become more apparent from the following detailed description and the accompanying drawings wherein:

Figure 1 is a perspective view of one embodiment of the invention;

Figures 2–5 illustrate further embodiments of the invention involving adjustable features, Figure 2 being an enlarged view;

Figure 6:
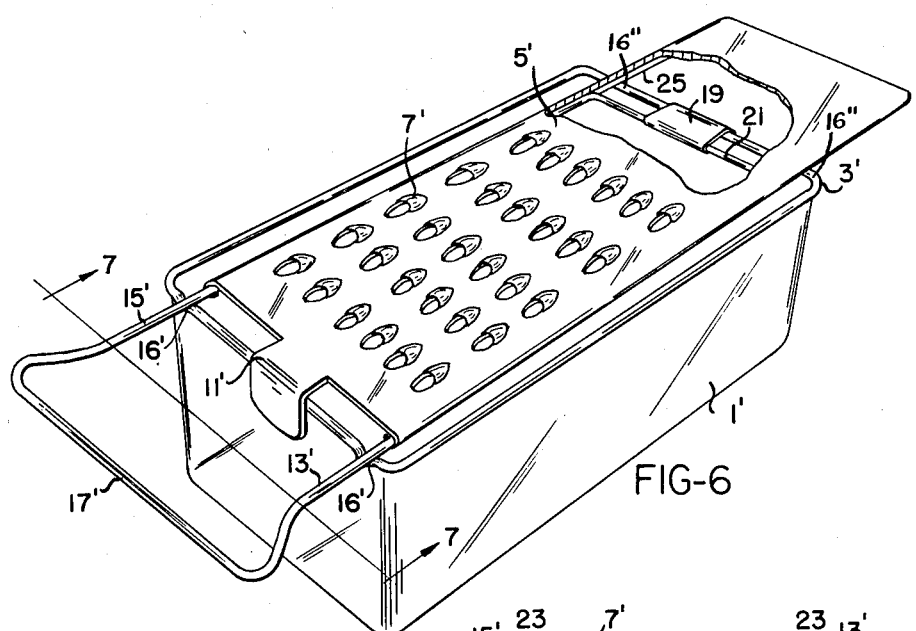
Figure 6 is an enlarged perspective view of the structure of Figure 3.
Figure 7:
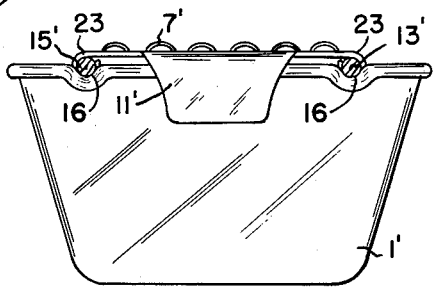
Figure 7 is a view taken on line 7—7 of Figure 6.

Referring to the drawings, and first particularly to Figure 1, there is shown at 1 a pan which may be of standard dimensions and which is provided at the outer edge thereof with a lip portion 3. Mounted on the pan is a slaw cutter having a plate element 5 which includes a cutter portion 7 and is provided at 9 and 11 with tongues which, as shown, extend over the lip 3 and securely hold the cutter on the pan. Mounted in tubular inturned portions 4 of the element 5 is a rod member indicated generally at 12 having arms 13 and 15 which terminate in a handle 17 and which at the handle end of the pan may rest on top of pan or in depressions 16 or 16' of the lip of a pan, as shown in Figures 1, 5, 6 and 7.

The tongues 9 and 11 of Figure 1 are integral with the plate 5 which is formed of a thin sheet metal and have an inherent resiliency which permits them to be expanded slightly to extend over the lip 3 and engage the same in tight fitting relation. Due to the inherent resiliency of the tongues 9 and 11 receivers such as 1 may be accommodated within a narrow range of length limits by the cutter.

Referring now to Figures 2–5, inclusive, there is shown another embodiment in which the element 5' having cutters 7' are mounted on the pan 1'. The element 5' is provided, similar to the structure of Figure 1, with a tongue 11'. In this instance, however, the arms 13' and 15' and the handle 17' are part of a rod member indicated generally at 12' which has a first connecting portion 21 connecting the arms of the end thereof remote from the handle 17'.

The arms are slidably mounted in tubular depending inturned portions at the edge of the element 5' as shown at 23 in Figure 2 and Figure 4 which is a section view taken on line 4—4 of Figure 5. These arms may be moved by exerting a pull or push on the handle 17' which permits the connecting portion 21 to move inwardly and outwardly relatively to the plate 5', the depending portions of which are cut away as at 25 to permit longitudinal passage of the portion 21 as shown most clearly in Figure 2.

Rotatably mounted on the portion 21 is a tongue 19 which extends over the lip 3' to securely engage the same and prevent movement of the rod member in one direction; element 11' prevents movement of the element 5' in the other direction in the mounted position shown in Figure 5.

It is to be noted that when in use the secure resilient engagement of these tongues with the pan is sufficient to inhibit any lateral motion of the plate with respect to the pan whether or not the lip 3' is adapted with depressions; further the engagement is such that should one edge only of a pan or other vessel be slightly irregular or at a slightly different height than the opposing edge (Figures 5, 6 and 7) the cutter will be securely retained even though it extend at a slight angle to the horizontal across the pan.

Figure 8:
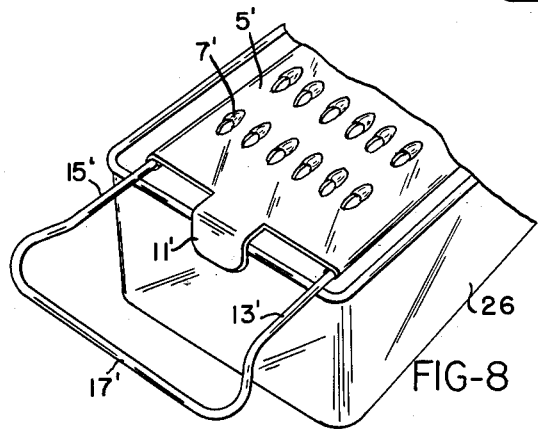
Figure 8 is a fragmentary and perspective view illustrating the cooperation of the novel slaw cutter with a standard pan.

Figures 3 and 6 clearly illustrate a manner of using the device of invention and as shown the handle 17' may be well extended in one direction while the plate element is well extended in the other direction, thus providing a large degree of adjustability for the slaw cutter. The edge which accommodates the inturned portions of the pan (Figure 6) may be grooved or depressed at 16" to receive the same if desired; however standard pans will receive the inturned portions thereon and the resilient engagement of the tongue 19 securely positions the cutter on such vessels. Figure 8 clearly shows the engagement of tongue 11' on dish 26.

It is to be noted in connection with the description of the embodiments of the invention that a device has been provided which may be rigidly applied to any of a variety of dishes, pans, receivers, and so forth, and that detachment from the same is easily accomplished as, for example, with the structure of Figure 2, by simply flipping the tongue 19 upwardly.

It will be understood that this invention is susceptible to modification in order to adapt it to different usages and conditions and accordingly, it is desired to comprehend such modifications within this invention as may fall within the scope of the appended claims.

I claim:

1. A slaw and vegetable cutter for use with open top containers of standard lengths comprising a cutter including a plate element having a rod member carried thereon at one end thereof, said rod member having a portion extending transversely of the plate member, a tongue integral with said element and depending from said element and another tongue extending from said transverse portion of said rod member, said tongues being engageable over opposed wall portions of a container for being secured thereon.

2. A slaw and vegetable cutter for use with open top containers of standard lengths comprising a cutter including a plate element having longitudinally extending tubular spaced bodies depending from opposite longitudinally extending sides thereof, a rod member having a U-shaped portion extending in a plane parallel to that of the plate element and the arms of which slidably engage in said tubular bodies and the connecting portion thereof having an extending tongue, the said cutter element having a depending tongue integral therewith disposed in opposite relation to said first tongue, said tongues being engageable over opposed wall portions of a container for being secured thereon.

3. A slaw and vegetable cutter for use with open top containers of standard lengths comprising a cutter including a plate element having longitudinally extending tubular depending bodies at opposed edges thereof, a rod member having a U-shaped portion extending in a plane parallel to that of the plate element and the arms of which slidably engage in said tubular bodies and the connecting portion thereof having an extending tongue, which is rotatable on the connecting portion, the said plate element having a depending tongue integral therewith disposed in opposite relation to said first tongue, said tongues being engageable over opposed wall portions of a container for being secured thereon.

4. A slaw and vegetable cutter for use with open top containers of standard lengths comprising a cutter including a plate element having depending tubular inturned edge portions, a rod member having a U-shaped portion extending in a plane parallel to that of the plate element and the arms of which slidably engage in said tubular inturned portions and the connecting portion thereof having an extending tongue which is rotatable on the connecting portion, the said plate element having a depending tongue integral therewith disposed in opposite relation to said first tongue, said tongues being engageable over opposed wall portions of a container for being secured thereon, the said first tongue and rod member being slidable with respect to and beneath said plate element.

5. A slaw and vegetable cutter for use with open top containers of standard lengths comprising a cutter including a plate element having longitudinally extending tubular inturned edge portions, an endless rod member having longitudinal arms thereof slidably engaging in said tubular portions and a first connecting portion thereof having an extending tongue which is rotatably mounted on the connecting portion, the arms and connecting portion lying in a plane below and parallel to that of the plate element, the said plate element having a depending tongue integral therewith disposed in opposite relation to said first tongue, said tongues being engageable over opposed wall portions of a container for being secured thereon, said rod member having a handle portion extending from and connecting the other ends of the arms for effecting slidable movement of said rod member.

6. A slaw and vegetable cutter for use with open top containers of standard lengths comprising a cutter including a plate element having a rod member secured thereto and therebeneath, the plate element and rod member being relatively movable in parallel planes, a tongue integral with and depending from said element at one end thereof and centrally of the width of the element, a second tongue rotatably mounted on and extending from said rod member at the other end of the element, said tongues being engageable over opposed wall portions of a container for being secured thereon.

References Cited in the file of this patent
UNITED STATES PATENTS

| | | |
|---|---|---|
| 555,834 | Taylor | Mar. 3, 1896 |
| 1,079,226 | Emanuel | Nov. 18, 1913 |
| 1,915,869 | Rowley | June 27, 1933 |
| 1,984,034 | Ryan | Dec. 11, 1934 |
| 2,447,714 | Richards | Aug. 24, 1948 |
| 2,601,087 | Buedingen | June 17, 1952 |